(12) United States Patent
Hanks et al.

(10) Patent No.: US 10,735,289 B2
(45) Date of Patent: Aug. 4, 2020

(54) MANAGEMENT OF BITLOADING PROFILES FOR NETWORK COMMUNICATIONS

(71) Applicant: ARRIS Enterprises LLC, Suwanee, GA (US)

(72) Inventors: William Turner Hanks, Carol Stream, IL (US); Thomas J. Cloonan, Lisle, IL (US); Yue Cheng, Inverness, IL (US); Erich C. Arnold, Cape Coral, FL (US); Jim Allen, Naperville, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 339 days.

(21) Appl. No.: 15/453,363

(22) Filed: Mar. 8, 2017

(65) Prior Publication Data

US 2018/0262412 A1 Sep. 13, 2018

(51) Int. Cl.
*G06F 13/00* (2006.01)
*H04L 12/26* (2006.01)
*H04L 29/08* (2006.01)

(52) U.S. Cl.
CPC ........ *H04L 43/0847* (2013.01); *H04L 67/303* (2013.01)

(58) Field of Classification Search
CPC ........ G06F 13/00; H03M 13/618; H04L 1/00; H04L 1/0003; H04L 1/0004; H04L 1/0005; H04L 1/0006; H04L 1/0041; H04L 5/0007; H04L 5/0006; H04L 5/0009; H04L 5/0046; H04L 5/0048; H04L 12/18; H04L 12/24; H04L 12/26; H04L 12/185; H04L 12/851; H04L 12/2602; H04L 27/00; H04L 27/12; H04L 27/2647; H04L 27/2657; H04L 27/2662; H04L 12/2697; H04L 29/06; H04L 29/08; H04L 29/08072; H04L 41/00; H04L 41/22; H04L 41/0806; H04L 41/0816; H04L 41/0893; H04L 43/00;
(Continued)

(56) References Cited

U.S. PATENT DOCUMENTS

2014/0133330 A1\* 5/2014 Chapman ............ H04L 41/0806
370/252
2015/0188653 A1 7/2015 Hanks et al.

OTHER PUBLICATIONS

Ron Hranac, "Modulation Error Ratio", SCTE Technical Columns, pp. 1-3, Jan. 2007 (Year: 2007).\*

\* cited by examiner

*Primary Examiner* — Robert B Harrell
(74) *Attorney, Agent, or Firm* — Chernoff, Vilhauer, McClung & Stenzel, LLP (57) ABSTRACT

A method receives error measurements from network elements. Groups of network elements are generated based on similarity of error measurements and a bitloading profile for each of the groups of network elements is generated based on the error measurements for each respective group. Each bitloading profile includes a modulation level determined to be sufficient for transporting content to respective groups of network elements. The method then assigns a set of bitloading profiles to each network element based on the groups of network elements and the bitloading profile generated for each of the groups. The bitloading profile for each of the groups of network elements and the assigned set of bitloading profiles are output to a network device. The network device uses the bitloading profiles to modulate content sent to respective customer premise equipment.

20 Claims, 10 Drawing Sheets

(58) Field of Classification Search
CPC ......... H04L 43/04; H04L 43/08; H04L 43/10;
H04L 43/50; H04L 43/0852; H04L 47/10;
H04L 47/2483; H04L 69/323; H04L
41/0681; H04L 43/0847; H04L 67/303;
H04J 11/00; H04J 11/0023; H04W 24/00;
H04W 24/01; H04W 24/02; H04W 24/03;
H04W 24/04
USPC .................................. 370/203, 252; 709/224
See application file for complete search history.

MANAGEMENT OF BITLOADING PROFILES FOR NETWORK COMMUNICATIONS

BACKGROUND

A network, such as a hybrid fiber-coaxial (HFC) network, may use orthogonal frequency division multiplexing (OFDM) channels to communicate with customer premise equipment (CPE) devices, such as cable modems. Each channel may include multiple subcarriers, and a particular modulation, such as a quadrature amplitude modulation (QAM) level, is used for each subcarrier. A bitloading profile is a vector of modulation descriptors corresponding to each subcarrier in the OFDM channel. Typically, a base case bitloading profile is used where the modulation level is selected such that all of the network elements connected to the channel can use the modulation. However, there may be some network elements, such as cable modems, using the channel that could use a higher level of modulation in at least some part of the channel's spectrum. network element

DETAILED DESCRIPTION

Described herein are techniques for a network communication system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments retrieve error measurements, such as modulation error ratio (MER) measurements, from network elements, such as cable modems. The error measurements may measure the error from sending signals using a modulation level, such as orthogonal frequency division multiplexing (OFDM) to the network elements. Particular embodiments then analyze the error measurements to generate groups of network elements that have similar error measurements. One or more bitloading profiles for groups of the customer premise equipment are generated with a modulation level determined to be sufficient for transporting content to any of the network elements in each group of network elements within an error margin. The bitloading profile is used to define the modulation level used to send content to the network element. Once the bitloading profiles are generated for the groups of network elements, then particular embodiments can assign the bitloading profiles to network elements. The bitloading profiles and assignments are provided to a network device that is delivering content to the network elements. The network device can then use the bitloading profiles to modulate the content that is sent to the groups of network elements.

System Overview

Figure 1:
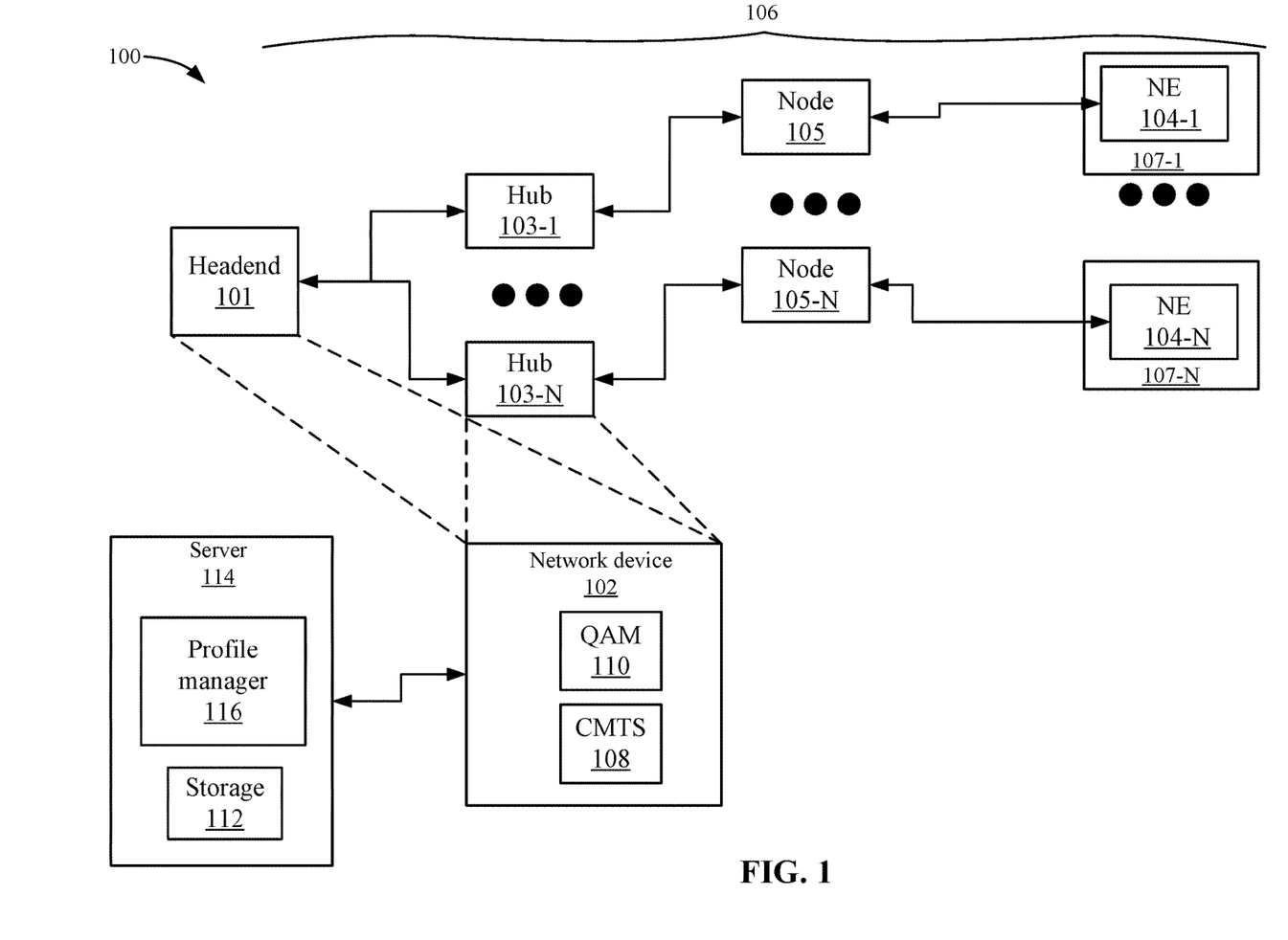
FIG. 1 depicts a simplified system for generating and assigning bitloading profiles to groups of network elements according to one embodiment.

FIG. 1 depicts a simplified system 100 for generating and assigning bitloading profiles to groups of network elements (NE) 104 according to one embodiment. System 100 includes a network device 102 that can deliver content to network elements 104-1-104-N through a network 106. In a downstream direction (DS), headend 101 receives content and sends the content through hubs 103-1-103-N. Hubs 103-1-103-N are connected to nodes 105-1-105-N where each node is connected to a subscriber premises 107-1-107-N and network element 104-1-104-N. Network device 102 may be included at various points of network 106. For example, network device 102 may be at the head end 101 of the network or in a hub 103 of the network. That is, the functions and components of network device 102 may be incorporated solely in headend 101, solely in hubs 120, or distributed between headend 101 and hubs 120.

Network elements 104 may include cable modems, set top boxes, televisions equipped with set top boxes, data over cable service interface specification (DOCSIS) terminal devices, media terminal adapters (MTA), and other computing devices that can receive content. Network elements 104 may be organized in service groups where one or more branches of a node 105 services a service group that includes a group of network elements 104. A node 105 may service network elements 104 in multiple subscriber locations 107. Also, network elements 104 may be connected to customer premise equipment (CPE) devices, such as televisions, mobile devices, etc., that can utilize the media content.

Network 106 may be a network that provides cable television, Internet data services, and voice services. In one embodiment, network 106 may be a hybrid fiber-coaxial (HFC) network but other types of networks may also be used, such as radio frequency over glass (RFOG) networks. In an HFC network, network 106 uses optical fiber for communications between the network device 102 and nodes 105, and then coaxial cable for communications between the nodes 105 and the network elements 104. Downstream (or the forward path) optical communications over the optical fiber may be converted at the nodes to radio frequency (RF) communications for transmission over coaxial cable. Also, upstream (or return path) RF communications from network elements 104 are sent over coaxial cables and converted at the nodes 105 to optical communications for transmission over the optical fiber. Nodes 105 may communicate via optical fibers with the hubs 103 and nodes 105 may communicate via coaxial cable to network elements 104.

Network device 102 may include a cable modem termination system (CMTS) 108, which terminates a connection with network elements 104. Network device 102 may also include a quadrature amplitude modulation (QAM) modulator 110 that modulates a signal to send content to network elements 104. CMTS 108 may use orthogonal frequency division multiplexing (OFDM), which is a manner of encoding digital data on multiple carrier frequencies, e.g., a plurality of subcarriers. The available bandwidth of an OFDM channel may be divided into many narrow bands for transmitting data on these bands in parallel, where the signals transmitted are mathematically orthogonal. An OFDM channel includes many subcarriers, where each subcarrier may use a different modulation level. The modulation level on each subcarrier results from varying the complex numbers at a Fourier transform input, e.g., an inverse fast Fourier transform input in a transmitter. The outputs include samples of a modulated multiplexed signal. A low symbol rate makes affordable the use of a guard interval between symbols, making it possible to minimize or eliminate intersymbol interference (ISI), and utilize echoes and time-spreading to achieve a diversity gain, e.g., a signal-to-noise ratio (SNR) improvement. Although QAM modulation is discussed, other types of modulation may be used.

Network elements 104, such as cable modems, convert signals received from CMTS 108 carried over fiber and/or coaxial lines in network 106. Network elements 104 convert the digital data to a modulated RF signal for upstream transmission and convert downstream RF signal to digital form. Thus, the conversion is done at a subscriber's location 107. Network elements 104 demodulate the downstream RF signal and feed the digital data to a subscriber device. On the return path, digital data is fed to network elements 104 (from an associated subscriber device), and network elements 104 convert the data to a modulated RF signal. Once the CMTS 108 receives the upstream RF signal, CMTS 108 demodulates the signal and transmits the digital data to its eventual destination.

CMTS 108 uses bitloading profiles stored in storage 112 to perform the modulation. A bitloading profile may include a vector of bitloading values that may define the modulation level that is used for each subcarrier by CMTS 108. In one embodiment, the modulation level may range from Quadrature Phase Shift Keying (QPSK), 4-QAM, 16-QAM, 64 QAM to N-QAM. The value of the bitloading profile defines which modulation level to use.

In one embodiment, network device 102 may be included in a converged cable access platform (CCAP) network device. In the CCAP architecture, QAM modulator 110 may be combined with CMTS 108 into a single network device. In another embodiment, CMTS 108 may be found in the head end 101 and QAM modulator 110 may be found in hub 103. Also, in one embodiment, system 100 uses the DOCSIS protocol, such as DOCSIS 3.1 to communicate. Although DOCSIS may be described, other protocols may be used that use OFDM.

CMTS 108 may provide different sized OFDM channels, which may be 192 MHz channels that include a number of subcarriers of a certain bandwidth, such as 50 KHz. Each subcarrier may include different modulation levels, which may be defined based on a bitloading profile. When sending content using the QAM modulation based on the bitloading profile, network elements 104 may experience some type of error. For example, the error may include imperfections in the signal path, such as noise, low emission trajection ratio, phase noise, carrier suppression, distortion, etc. This may cause modulation errors that can be measured. For example, network elements 104 may measure a modulation error ratio (MER) that is a measure of the energy of decoded signals divided by the energy of the modulation. The MER may be an estimate of signal-to-noise ratio (SNR) at network elements 104.

A server 114 may receive the error measurements from network elements 104. Then, a profile manager 116 can analyze the error measurements to generate groups of network elements that have similar error measurements within a threshold. Profile manager 116 generates bitloading profiles with a per-subcarrier modulation that can be used by all of the network elements 104 in each group with some amount of operating margin. For example, some modulation error in a signal is accounted for in calculating an appropriate modulation level for the bitloading profiles. Profile manager 116 can then communicate the bitloading profiles and the groups of network elements 104 to network device 102. CMTS 108 implements the bitloading profiles.

Although server 114 is shown external to network device 102, it will be understood that the functions of server 114, such as profile manager 116 may be implemented in other devices of system 100. For example, the functions of server 114 may be included in network device 102, such as within CMTS 108. Different communication schemes may be used depending on where server 114 is located in network 106, which will be discussed in more detail below. Further, in addition to calculating the bitloading profiles and groups, profile manager 116 may re-calculate the bitloading profiles and groups in response to an observed event or a user input and output alerts or change the configuration of network device 102.

Bitloading Profile and Group Generation

Figure 2:
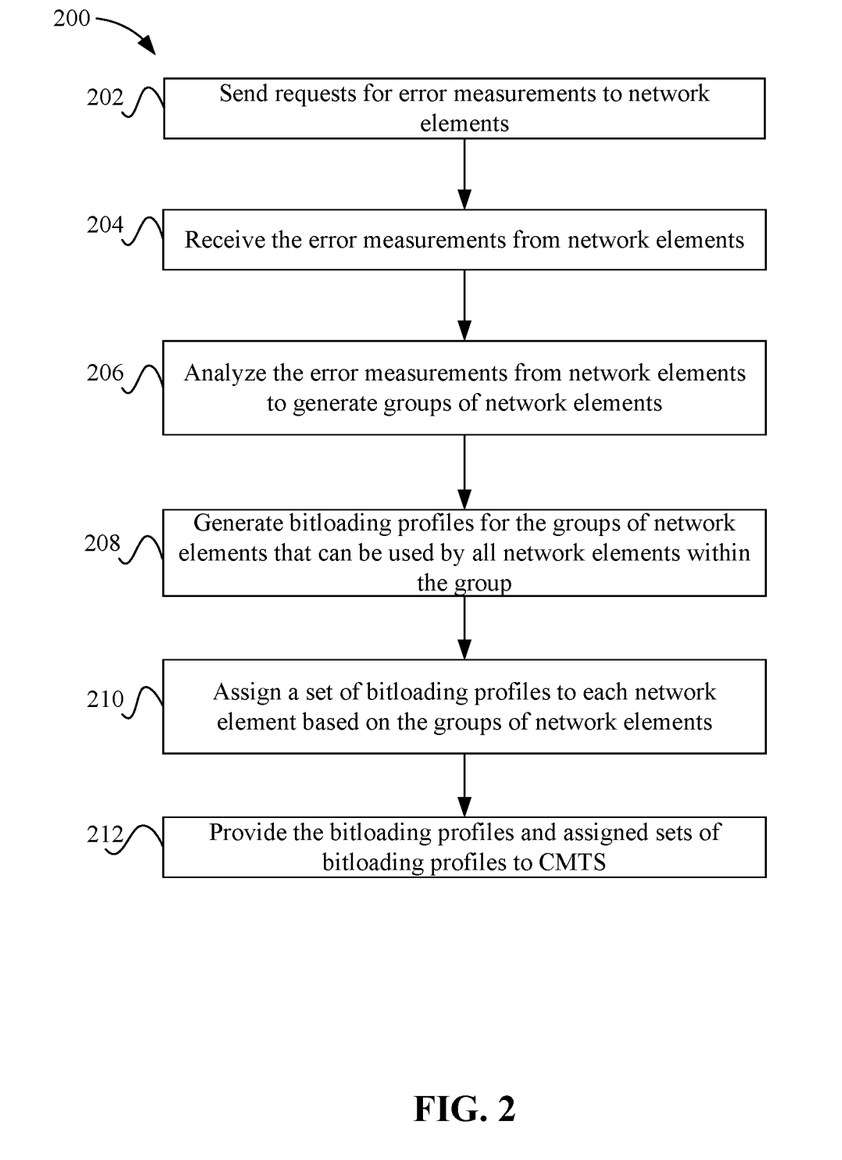
FIG. 2 depicts a simplified flowchart of a method for generating bitloading profiles according to one embodiment.

FIG. 2 depicts a simplified flowchart 200 of a method for generating bitloading profiles according to one embodiment. At 202, requests are sent for error measurements to network elements 104. The requests may be sent via different techniques, such as via in-band signaling and via out-of-band signaling. The in-band signaling may use a communication protocol, such as DOCSIS, to send the requests from CMTS 108 to network elements 104. In the in-band signaling, network device 102 is an endpoint for the communications with network elements 104. In the out-of-band signaling, server 114 is the endpoint where server 114 sends a message to network elements 104 that are sent through CMTS 108. These messages are transferred through network device 102 and network device 102 is not the endpoint for the responses from network elements 104.

At 204, profile manager 116 receives the error measurements from network elements 104. In one embodiment, the error measurements are MER measurements, which may be a vector that lists the MER measurements across the many subcarriers of the channel. The vector may be referred to as an RxMER vector (e.g., a receiver (Rx) MER vector). A measure of the transmitted or received signal quality of a modulated signal quantifies a performance of the transmitter or receiver. Ideally, the modulated signal sent by a transmitter or received by a receiver would have all constellation points precisely at ideal locations. However, various imperfections in the implementation or signal path, such as noise, low image rejection ratio, phase noise, carrier suppression, distortion, etc.), can cause the actual constellation points to deviate from the ideal locations at the receiver of a network element 104. For example, the downstream (DS) Signal-to-Noise Ratio (SNR) measurement at the radio frequency (RF) input of any network elements 104 varies over frequency due to reasons such as the noise and the frequency response of the plant components (cables, taps, amplifiers, etc.) between the CMTS 108 and network elements 104. The MER is the energy of decoded symbols divided by the energy of the modulation, which is a good estimate for the SNR, such as when the values are large. Although an RxMER vector is described, other methods for quantifying the error experienced at a network element may also be used.

At 206, profile manager 116 analyzes the error measurements from network elements 104 to generate groups of network elements 104. In one embodiment, the analysis may use a clustering algorithm that may generate groups of network elements 104 that are experiencing similar conditions within a threshold. For example, groups of network elements 104 along a same signal path may be experiencing the same errors. Then, at 208, profile manager 116 may generate bitloading profiles for the groups of network elements 104. The bitloading profiles may specify a modulation level for each subcarrier that can be used across the group associated with the bitloading profile. For example, the modulation level of a bitloading profile may be selected to accommodate all of the group of network elements 104. If it is determined that the group of network elements can use 256-QAM, then the bitloading profile may specify 256-QAM is used. Also, profile manager 116 may generate additional bitloading profiles for each subcarrier for the groups up to the maximum allowed for a channel.

At 210, profile manager 116 assigns a set of bitloading profiles to each network element 104 based on the groups of network elements 104. For example, a network element 104 may be a member of multiple groups. Multiple bitloading profiles from those groups may be assigned to network element 104. Also, profile manager 116 assigns a configured number of bitloading profiles for a downstream channel by grouping network elements 104 with similar error measurements and determines bitloading profiles that are predicted to be sufficient to provide a configured amount of calculated operating margin, such as RF error margin, while providing a data transport that is as efficient as possible. For example, profile manager 116 may map each network element 104 assigned on a channel to a maximum number of bitloading profiles that the channel and network element can accommodate. For example, when assigning bitloading profiles to a network element 104, profile manager 116 may identify bitloading profiles that were constructed for other groups of network elements that do not include this network element 104. The bitloading profiles may have less demanding modulation levels (may be more robust against channel impediments) that could be used by this network element 104.

At 212, profile manager 116 provides the bitloading profiles and assigned sets of bitloading profiles to CMTS 108. When server 114 is located external to network device 102, profile manager 116 may send the profiles and groups via an interface and network to CMTS 108. For example, profile manager 116 sends commands via a command line interface (CLI) to CMTS 108 to configure CMTS 108 to use the bitloading profiles. In another embodiment, when server 114 is located internal to network device 102, profile manager 116 may send the profiles and groups directly to CMTS 108 without external communication.

Figure 3:
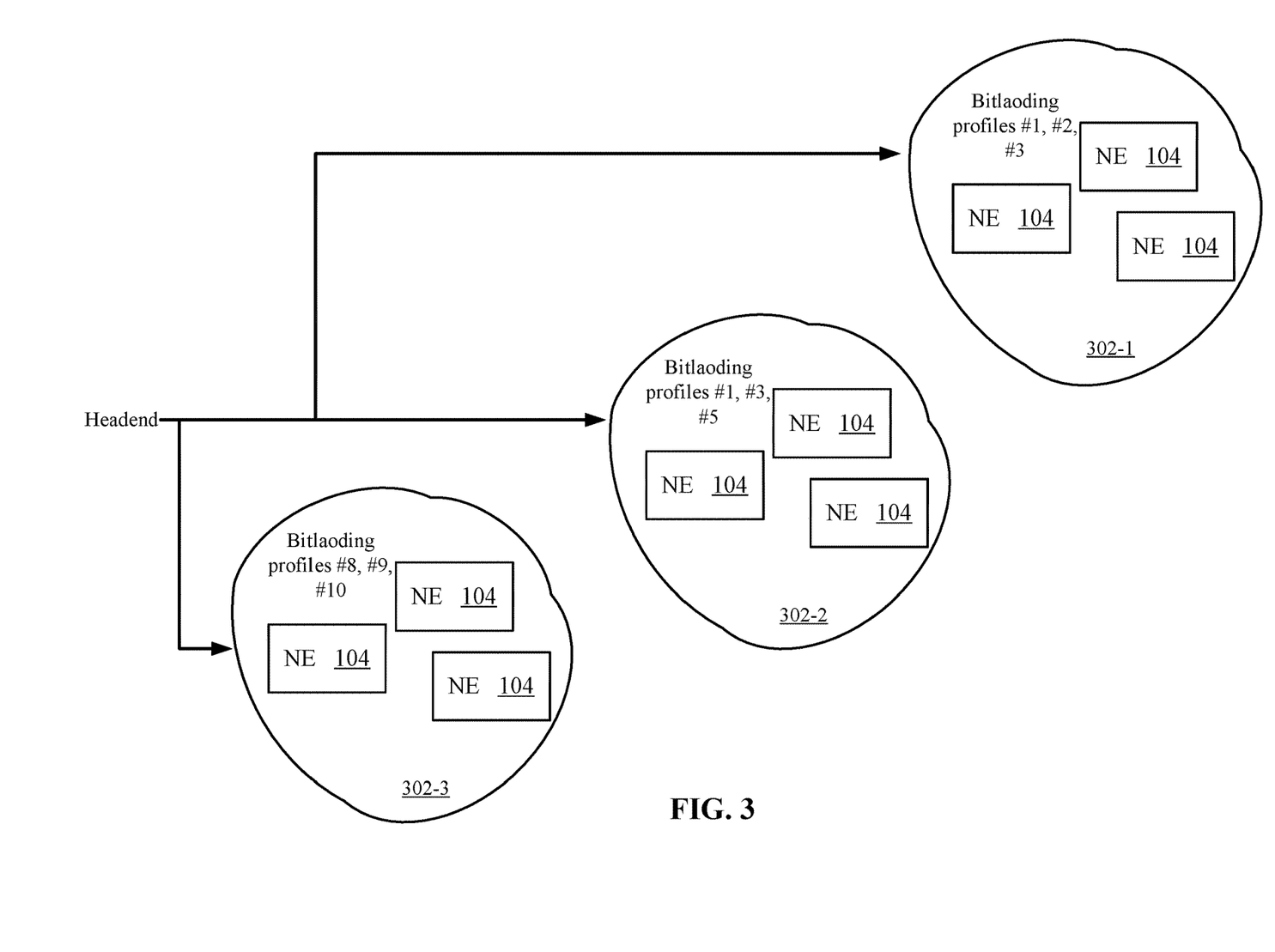
FIG. 3 shows an example of groups that may be generated according to one embodiment.

FIG. 3 shows an example of groups that may be generated according to one embodiment. In one embodiment, network elements 104 may experience similar types of imperfections along a signal path. For example, network elements 104 may be at the end of a signal path and experience the same imperfections. Thus, the network elements error measurements may be similar.

At 302-1, a group of network elements 104 is shown. In this case, these network elements may be assigned bitloading profiles #1, #2, and #3. Also, at 302-2, a group of network elements 104 may be assigned bitloading profiles #1, #3, and #5. At 302-3, another group of network elements 104 may be assigned bitloading profiles #8, #9, and #10.

In one embodiment, the groups may share a signal path to network device 102. However, this is not necessary as the grouping algorithm attempts to group network elements 104 that are experiencing similar error measurements.

Signaling of Error Measurements

Figure 4A:
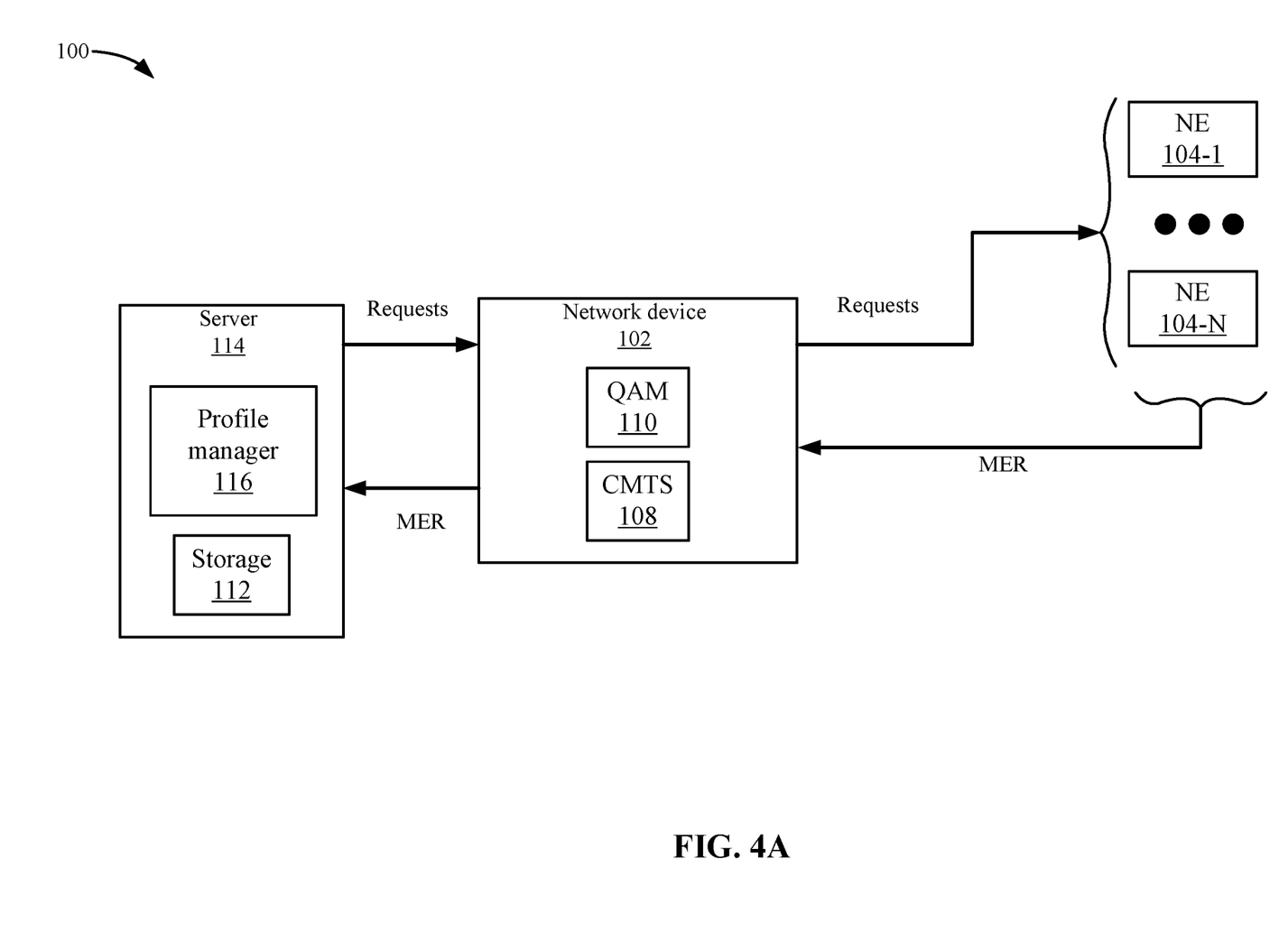
FIGS. 4A, 4B, and 4C depict different ways in which the error measurements may be requested and received according to one embodiment.
Figure 4B:
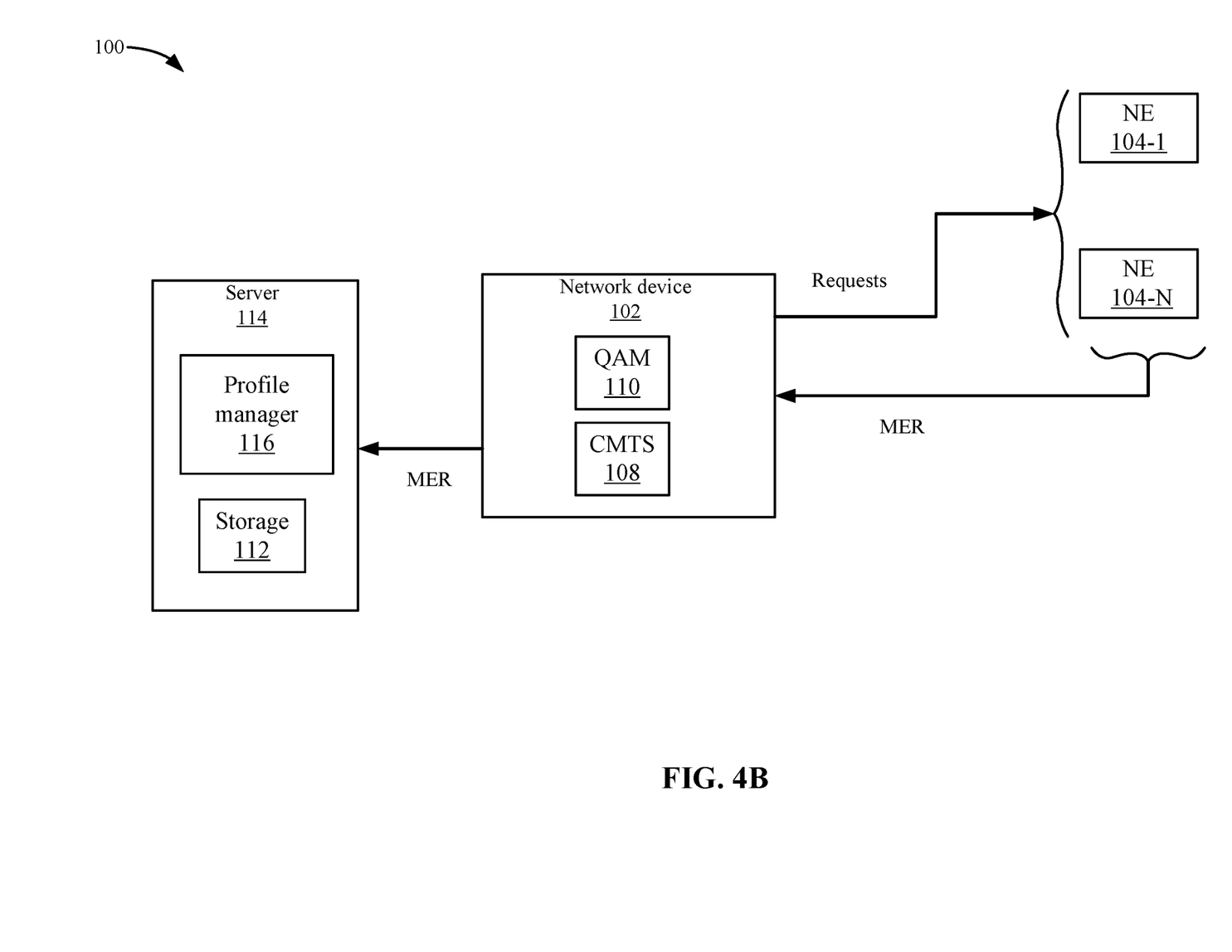
Figure 4C:
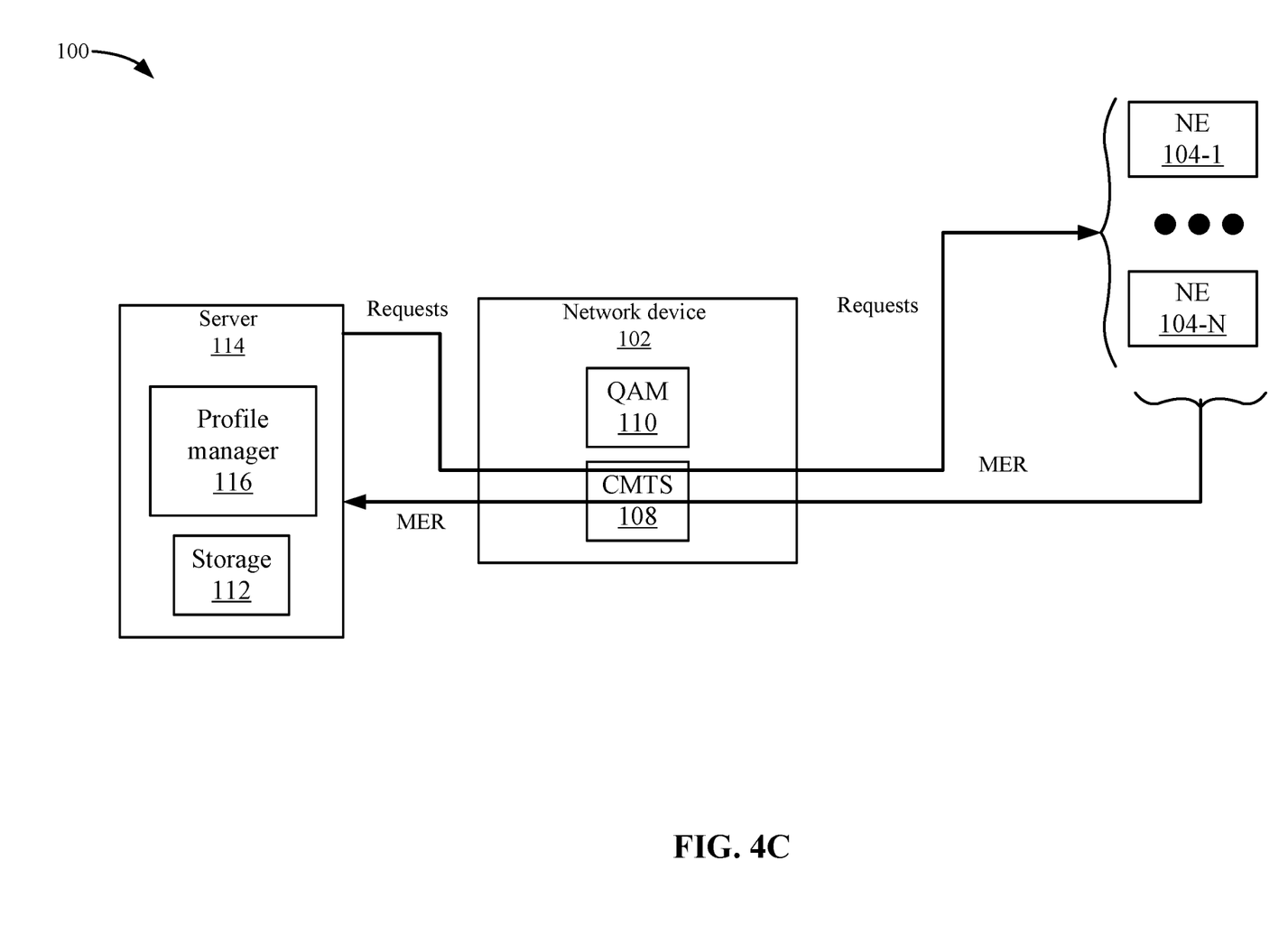

FIGS. 4A, 4B, and 4C depict different ways in which the error measurements may be requested and received according to one embodiment. As mentioned above, in-band and out-of-band signaling may be used. In FIG. 4A, out-of-band signaling is used to send the requests. For example, profile manager 116 sends a request to network elements 104 for error measurements. The requests are sent through network device 102 to network elements 104. In this case, profile manager 116 is the endpoint for network elements 104 and network device 102 is sending the messages to network elements 104. In one embodiment, network device 102 may receive the messages from profile manager 116 and create requests to network elements 104. For example, CMTS 108 may create differently formatted requests for network elements 104, but profile manger 116 is still the endpoint for the requests.

When network elements 104 respond with the error measurements, network elements 104 send the error measurements to profile manager 116 as the endpoint. Network device 102 passes the error measurements to profile manager 116. Network device 102 may similarly create differently formatted messages for profile manger 116.

In FIG. 4B, in-band signaling is used to request the error measurements. In this case, CMTS 108 is the endpoint for network device 102. CMTS 108 sends the request to network elements 104 for the error measurements. Network elements 104 then send the error measurements to network device 102 as the endpoint. Once receiving the measurements, network device 102 is configured to send the error measurements to profile manager 116. In this case, profile manager 116 does not send the error measurement requests through network device 102. However, profile manager 116 may send a signal to network device 102 that causes CMTS 108 to generate the requests to network elements 104.

In FIG. 4C, data transport is used to send the requests directly from server 114 through network device 102 to network elements 104. These requests may traverse CMTS 108, but are passed through CMTS 108 without alteration as data packets. The MER measurements may be sent directly back to profile manager 116 through CMTS 108 using the same data transport mechanism.

Bitloading Profile Usage

Figure 5:
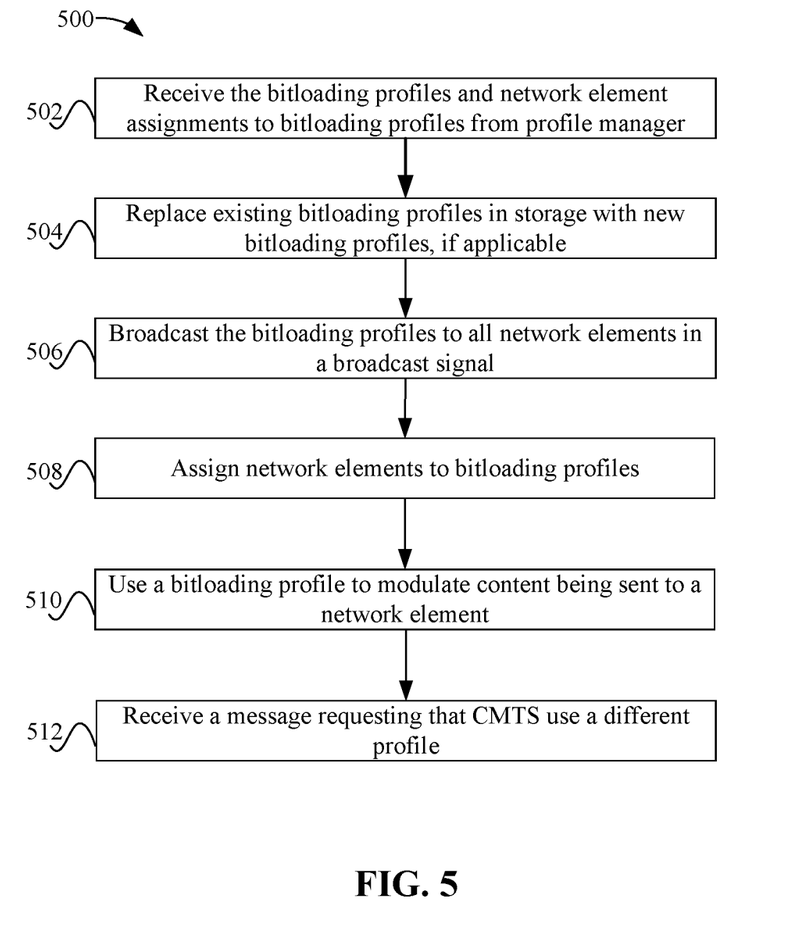
FIG. 5 depicts a simplified flowchart for using the new bitloading profiles according to one embodiment.

Once network device 102 receives the bitloading profiles, network device 102 may configure the bitloading profiles for use. FIG. 5 depicts a simplified flowchart 500 for using the new bitloading profiles according to one embodiment. At 502, CMTS 108 receives the bitloading profiles and network element assignments to bitloading profiles from profile manager 116. The bitloading profiles may define the modulation level that is used by CMTS 108 for different subcarriers. In one embodiment, any number of bitloading profiles may be received. However, in one embodiment, the number of profiles may be limited by the DOCSIS standard. The profile manager 116 assists the CMTS 108 in assigning which bitloading profiles are to be assigned to which network elements 104. For example, the assignments calculated in 210 in FIG. 2 are provided to CMTS 108. CMTS 108 uses the assignments to determine which bitloading profiles to assign to each network element 104.

At 504, CMTS 108 may replace existing bitloading profiles in storage 112 with new bitloading profiles, if applicable. For example, a bitloading profile #0 may be received from profile manager 116, and CMTS 108 replaces bitloading profile #0 in storage 112. This may assign a different modulation level to subcarriers of bitloading profile #0, such as changing the modulation level from QPSK to 256-QAM. Also, CMTS 108 may add a bitloading profile to storage 112. For example, instead of replacing an existing bitloading profile, another bitloading profile is added to storage 112.

At 506, CMTS 108 broadcasts the bitloading profiles to all network elements 104 in a broadcast signal. This lets network elements 104 know the bitloading profiles that are currently in use. At 508, CMTS 108 assigns network elements 104 to bitloading profiles. CMTS 108 may replace the bitloading profiles in storage 112. Then, the assigned sets of bitloading profiles are reviewed. If the set of bitloading profiles assigned to a network element 104 results in the same bitloading profiles being used, then CMTS 108 does not need to communicate any new bitloading profiles to be used to network element 104. However, if network element 104 is using a different group of bitloading profiles, then CMTS 108 communicates the set of bitloading profiles to network element 104. For example, a network element 104 may be initially using bitloading profiles #0, #1, and #2. However, network element 104 may be assigned to profiles #0, #1, and #4. In this case, CMTS 108 may communicate to network element 104 the new group of bitloading profiles to use. This analysis may be performed for each network element 104 either by profile manager 116 or CMTS 108.

At 510, CMTS 108 uses a bitloading profile to modulate content being sent to a network element 104. For example, if network element 104 is assigned profile #0, then that bitloading profile #0 is used by CMTS 108 to perform modulation of content sent to network element 104.

At one point, network element 104 may choose to use a different profile. For example, at 512, CMTS 108 receives a message requesting that CMTS 108 use a different profile from network element 104. CMTS 108 may then use a different profile. For example, CMTS 108 may use a profile #1 to perform modulation of content sent to network element 104 now. Network element 104 may choose to change bitloading profiles based on some analysis of the error measurement. For example, network element 104 may determine that a higher or lower order of modulation is to be used.

Figure 6A:
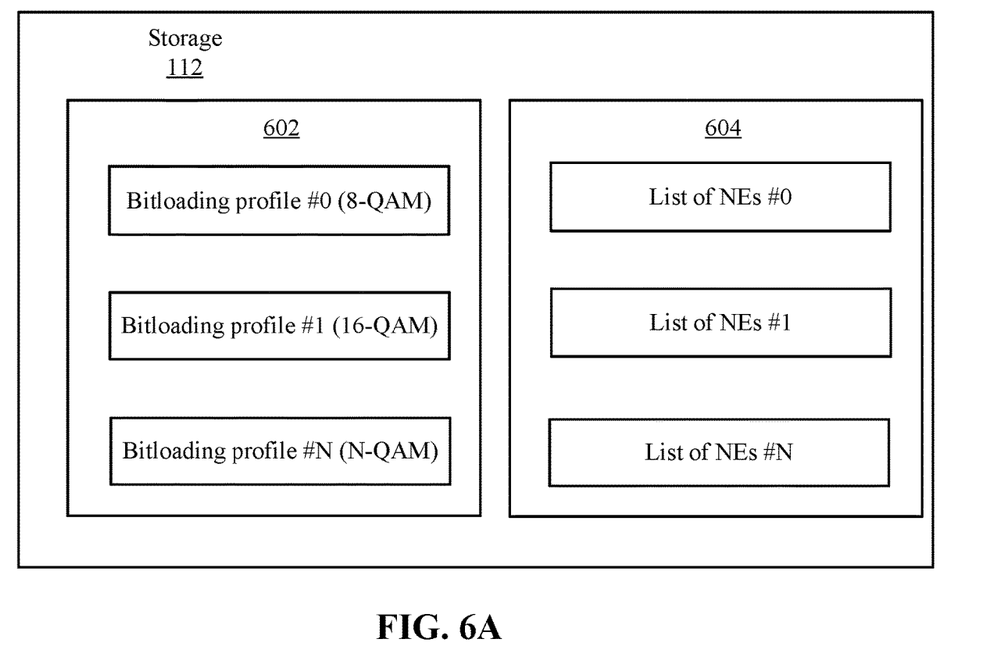
FIGS. 6A and 6B depict an example of managing bitloading profiles in storage according to one embodiment.
Figure 6B:
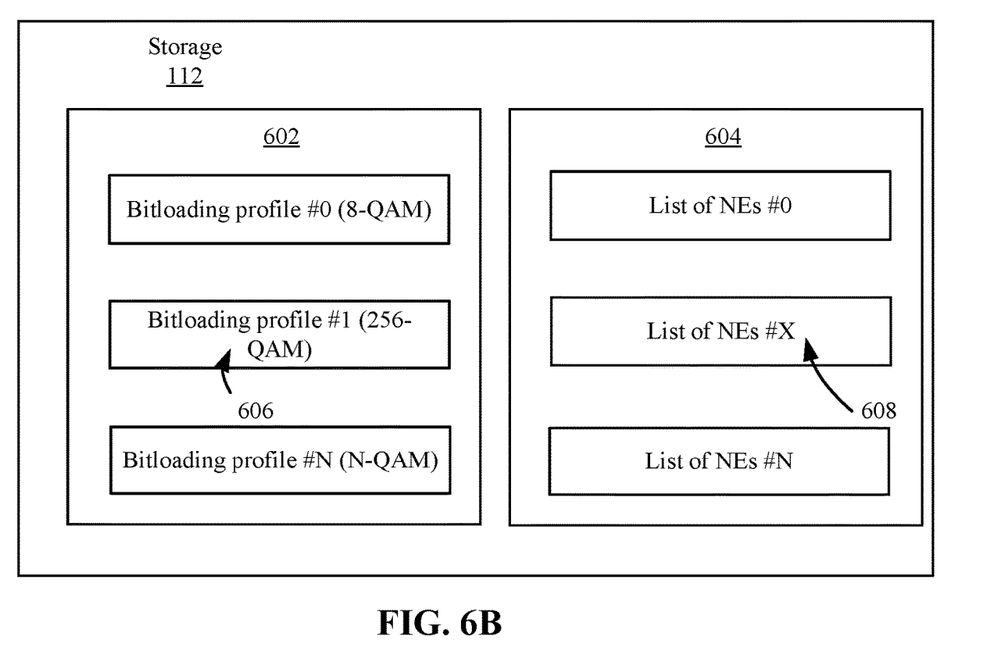

FIGS. 6A and 6B depict an example of managing bitloading profiles in storage 112 according to one embodiment. As shown, bitloading profiles #0, #1 . . . # N are shown with respective modulation levels of 8-QAM, 16-QAM, . . . , N-QAM. At 604, a list of network elements that are associated with each profile are stored. For example, the media access control (MAC) address may be used as an identifier for specific network elements.

When a bitloading profile is replaced, the modulation order associated with that profile may be changed. FIG. 6B shows the changing of a bitloading profile according to one embodiment. For example, some number of subcarriers in bitloading profile #1 may be changed from a 16-QAM modulation level to a 256-QAM modulation level. At 606, a switch from the modulation level is shown for profile #1. The network elements that can use this profile may also change. For example, at 608, some identifiers are changed for the bitloading profile changing the list to list of CPEs # X.

Bitloading Profile Re-Calculation

Figure 7:
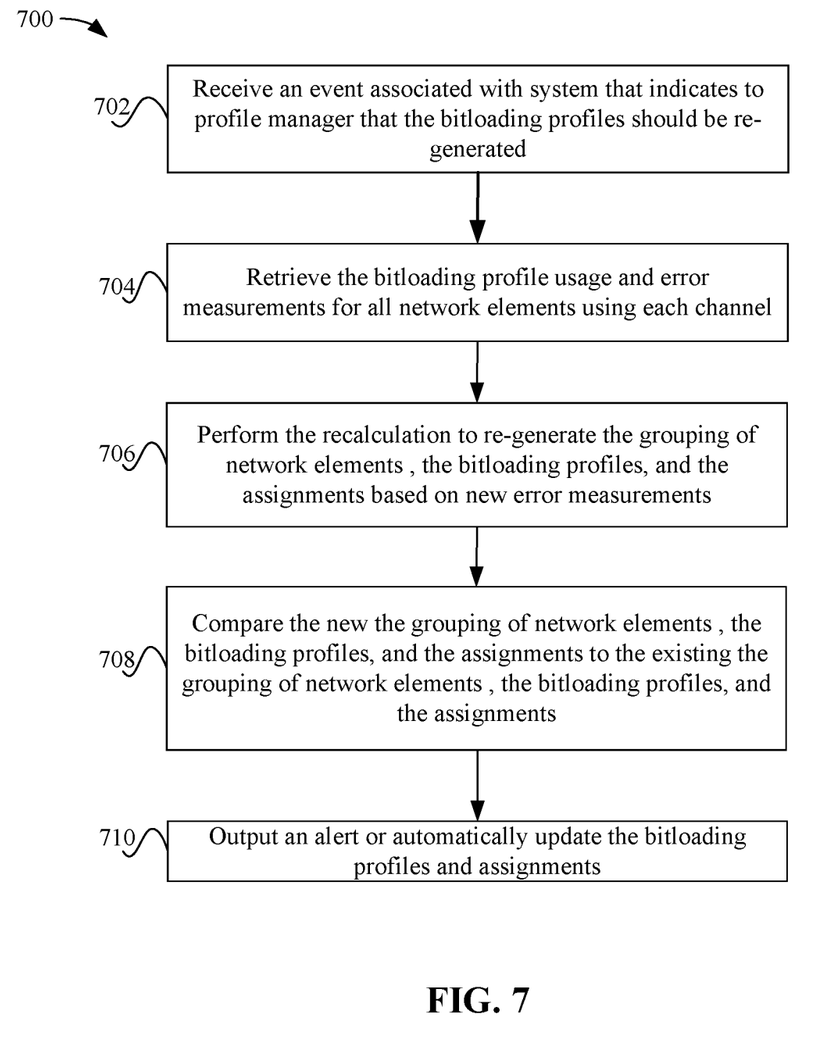
FIG. 7 depicts a simplified flowchart of a method for recalculating bitloading profiles according to one embodiment.

Conditions may change in the network that may affect the modulation error. For example, the network conditions may change over time due to aging, temperature, RF ingress, or other factors. Accordingly, a bitloading profile calculated at one instance in time may not be appropriate at another time. Profile manager 116 may store the calculations for the bitloading profiles and the groups for each channel locally or at network device 102. These calculations may then be retrieved in the future for comparison against additional calculations. FIG. 7 depicts a simplified flowchart 700 of a method for recalculating bitloading profiles according to one embodiment. At 702, profile manager 116 receives an event associated with system 100 that indicates to profile manager 116 that the bitloading profiles should be re-generated. An event may include some type of error received in system 100, any condition detected that meets or violates a threshold, or may be a set time elapses. For example, the bitloading profiles may be recalculated after a set time if no other events have been received to cause recalculation.

At 704, profile manager 116 may retrieve the bitloading profile usage and error measurements for all network elements using each channel. In one embodiment, this process may be performed continuously in a periodic background process.

At 706, profile manager 116 performs the recalculation to re-generate the grouping of network elements 104, the bitloading profiles, and the assignments based on new error measurements. For example, the process of FIG. 2 may be performed again.

At 708, profile manager 116 compares the new the grouping of network elements 104, the bitloading profiles, and/or the assignments to the existing the grouping of network elements 104, the bitloading profiles, and the assignments. For example, the comparison may compare the modulation level calculated for the bitloading profiles and/or any changes in the grouping. This may indicate to profile manager 116 certain conditions that are occurring. For example, some conditions include the newly-calculated bitloading profiles are different from the currently active bitloading profiles by a provisioned threshold for a provisioned percentage of the bitloading profiles subcarriers. Also, a most recent error measurement of any network element 104 indicates that the network element 104 now has less than a provisioned sustaining threshold of noise margin for a provisioned number of network elements assigned bitloading profiles. The noise margin may be different from the calculated RF noise margin used to create the profiles. Another condition may be that the most recent error measurement of any network element 104 indicates that the network element now measures the error measurement that is better than a provisioned improvement threshold for a provisioned percentage of subcarriers of the channel. Another condition may be the system may be unable to collect an error measurement from a network element for a configured threshold of time. Further, another condition is the bitloading profile predicted for a network element (or a bitloading profile that is perhaps more bandwidth efficient) is not being used for at least a provisioned threshold percentage of time for the network element. Finally, another condition is the actual code word error rate for the channel is greater than predicted by profile manager 116. In this case, profile manager 116 may add a provisioned additional bit of margin to future calculations.

If any or some of these conditions result, at 710, profile manager 116 may output an alert or automatically update the bitloading profiles and assignments. The alert may either notify an operator of system 100 or may be sent to network device 102 for automatic implementation of a change. For example, the alert may change the bitloading profiles used by a network element 104, change the bitloading profiles, or cause a network element 104 to use a different primary bitloading profile. The automatic updating of the bitloading profiles and assignments may be performed without user intervention.

Accordingly, profile manager 116 may configure network device 102 to use a more efficient (and less robust in terms of noise sensitivity) modulation in system 100. The grouping of network elements 104 allows bitloading profiles to be generated that are more tuned to the performance of the network. Further, profile manager 116 reacts to changes in the conditions of system 100 to recalculate bitloading profiles.

System

Figure 8:
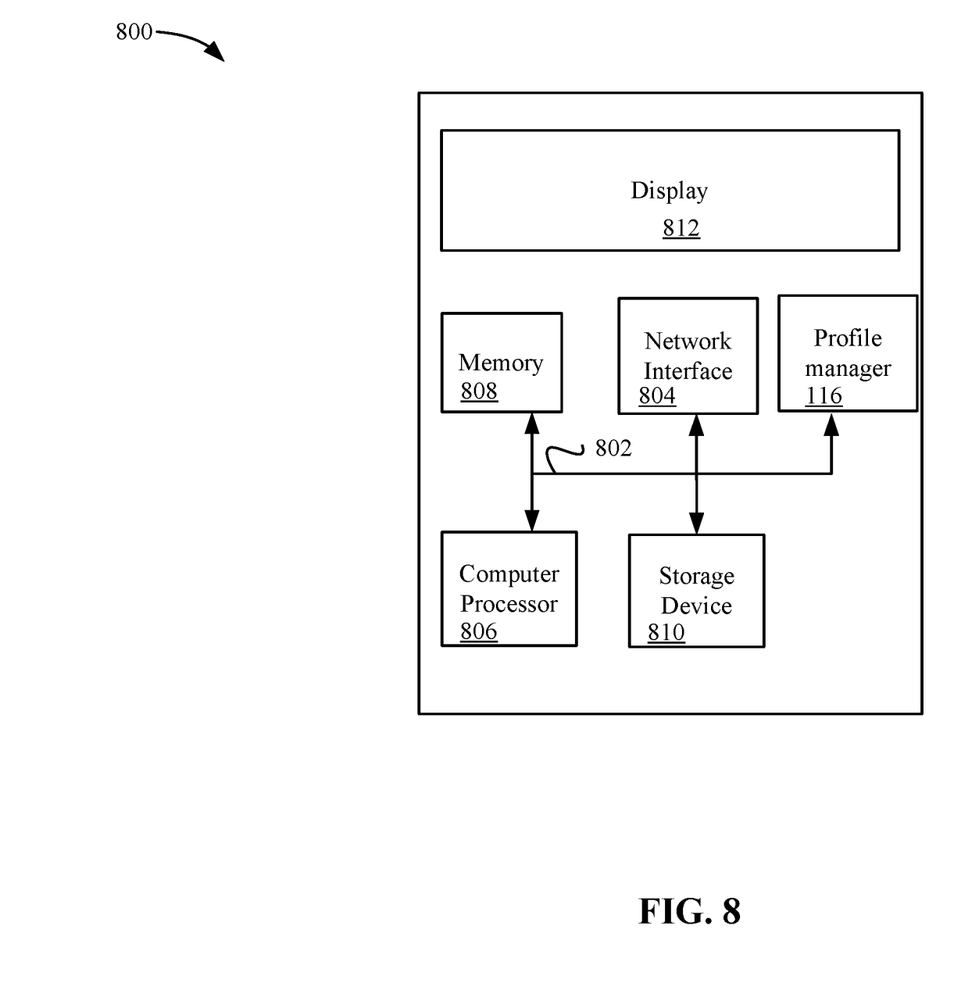
FIG. 8 illustrates an example of a special purpose computer system configured with profile manager according to one embodiment.

FIG. 8 illustrates an example of a special purpose computer system 800 configured with profile manager 116 according to one embodiment. Computer system 800 includes a bus 802, network interface 804, a computer processor 806, a memory 808, a storage device 810, and a display 812.

Bus 802 may be a communication mechanism for communicating information. Computer processor 806 may execute computer programs stored in memory 808 or storage device 808. Any suitable programming language can be used to implement the routines of particular embodiments including C, C++, Java, assembly language, etc. Different programming techniques can be employed such as procedural or object oriented. The routines can execute on a single computer system 800 or multiple computer systems 800. Further, multiple computer processors 806 may be used.

Memory 808 may store instructions, such as source code or binary code, for performing the techniques described above. Memory 808 may also be used for storing variables or other intermediate information during execution of instructions to be executed by processor 806. Examples of memory 808 include random access memory (RAM), read only memory (ROM), or both.

Storage device 810 may also store instructions, such as source code or binary code, for performing the techniques described above. Storage device 810 may additionally store data used and manipulated by computer processor 806. For example, storage device 810 may be a database that is accessed by computer system 800. Other examples of storage device 810 include random access memory (RAM), read only memory (ROM), a hard drive, a magnetic disk, an optical disk, a CD-ROM, a DVD, a flash memory, a USB memory card, or any other medium from which a computer can read.

Memory 808 or storage device 810 may be an example of a non-transitory computer-readable storage medium for use by or in connection with computer system 800. The non-transitory computer-readable storage medium contains instructions for controlling a computer system 800 to be configured to perform functions described by particular embodiments. The instructions, when executed by one or more computer processors 806, may be configured to perform that which is described in particular embodiments.

Computer system 800 includes a display 812 for displaying information to a computer user. Display 812 may display a user interface used by a user to interact with computer system 800.

Computer system 800 also includes a network interface 804 to provide data communication connection over a network, such as a local area network (LAN) or wide area network (WAN). Wireless networks may also be used. In any such implementation, network interface 804 sends and receives electrical, electromagnetic, or optical signals that carry digital data streams representing various types of information.

Computer system 800 can send and receive information through network interface 804 across a network 814, which may be an Intranet or the Internet. Computer system 800 may interact with other computer systems 800 through network 814. In some examples, client-server communications occur through network 814. Also, implementations of particular embodiments may be distributed across computer systems 800 through network 814.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:

receiving, by a computing device in communication with a CMTS, a plurality of RxMER vector error measurements from a plurality of network elements, wherein each RxMER vector error measurement measures an error in a modulation of a signal received by a respective network element;

generating, by the computing device, a plurality of groups of network elements based on similarity in the plurality of RxMER vector error measurements;

generating, by the computing device, a bitloading profile for each of the plurality of groups of network elements based on the RxMER vector error measurements for each respective group of network elements, wherein each bitloading profile includes a modulation level determined to be sufficient for transporting content to respective groups of network elements;

assigning, by the computing device, a current set of bitloading profiles to each network element in the plurality of network elements based on the plurality of groups of network elements and the bitloading profile generated for each of the groups of network elements;

comparing the current set of bitloading profiles to a stored, past set of bitloading profiles used by the CMTS to modulate content sent to respective customer premise equipment associated with the set of bitloading profiles, and based on said comparison, selectively outputting, by the computing device, the bitloading profile for each of the plurality of groups of network elements and the assigned set of bitloading profiles to the CMTS, wherein the CMTS uses the current set of bitloading profiles to modulate content sent to respective customer premise equipment associated with the set of bitloading profiles.

2. The method of claim 1, further comprising:
storing the bitloading profile for each of the groups of network elements and the assigned set of bitloading profiles.

3. The method of claim 2, further comprising:
generating an alert based on comparing one or more of the second plurality of RxMER vector error measurements to the first plurality of RxMER vector error measurements, the second plurality of groups of network elements to the first plurality of groups of network elements, and the second set of bitloading profiles to the first set of bitloading profiles.

4. The method of claim 3, wherein the alert is generated when one or more of the bitloading profile for each of the second plurality of groups of network elements are different from the bitloading profile for each of the first plurality of groups of network elements by a threshold.

5. The method of claim 3, wherein the alert is generated when a most recent RxMER vector error measurement indicates that a network element now has less than a threshold of error margin for the first set of bitloading profiles assigned to the network element.

6. The method of claim 3, wherein the alert is generated when the RxMER vector error measurement of a network element indicates that the network element now measures the RxMER vector error measurement that is better than a threshold.

7. The method of claim 3 wherein the alert is generated when one or more of an RxMER vector error measurement from a network element is not received for a threshold of time and the bitloading profile generated for a network element is not being used for at threshold percentage of time for the network element.

8. The method of claim 3, wherein each bitloading profile includes a modulation level for each subcarrier in a channel determined to be sufficient for transporting content to respective groups of network elements.

9. The method of claim 2, wherein the plurality of groups of network elements comprises a first plurality of groups of network elements, the set of bitloading profiles comprises a second set of bitloading profiles, and the plurality of RxMER vector error measurements comprises a first plurality of RxMER vector error measurements, the method further comprising:
receiving a second plurality of RxMER vector error measurements from the plurality of network elements;
generating a second plurality of groups of network elements based on similarity in the second plurality of RxMER vector error measurements;
generating a bitloading profile for each of the second plurality of groups of network elements based on the RxMER vector error measurements for each respective second group of network elements; and
assigning a second set of bitloading profiles to each network element in the plurality of network elements based on the second plurality of groups of network elements and the bitloading profile generated for each of the second plurality of groups of network elements.

10. The method of claim 2, further comprising:
automatically outputting the bitloading profile for each of the second plurality of groups of network elements and the assigned second set of bitloading profiles to the network device, wherein the network device uses the second set of bitloading profiles to modulate content sent to respective network elements associated with the second set of bitloading profiles.

11. The method of claim 1, further comprising:
causing a sending a plurality of requests for the plurality of RxMER vector error measurements to the plurality of network elements.

12. The method of claim 11, wherein causing the sending the plurality of requests comprises:
sending the plurality of requests out of band to the plurality of network elements via the network device, wherein the computing device is an endpoint for receiving messages including the plurality of error measurements.

13. The method of claim 11, wherein causing the sending the plurality of requests comprises:
receiving messages including the plurality of RxMER vector error measurements from the network device, wherein the plurality of requests were sent in-band to the plurality of network elements by the network device, wherein the network device is an endpoint for receiving the plurality of RxMER vector error measurements from the plurality of network elements.

14. The method of claim 1, wherein outputting comprises sending the bitloading profile for each of the groups of network elements and the assigned set of bitloading profiles via an interface to the network device, the network device being separate from the computing device.

15. The method of claim 1, wherein outputting comprises sending the bitloading profile for each of the groups of network elements and the assigned set of bitloading profiles via an interface internal to the network device, the network device being a same device as the computing device.

16. The method of claim 1, wherein assigning comprises:
when a network element is a member of multiple groups of network elements, assigning multiple bitloading profiles to the network element that correspond to the multiple sets of groups of network elements.

17. The method of claim 1, wherein generating a bitloading profile for each of the groups of network elements comprises:
generating a maximum number of bitloading profiles allowed by a channel for transporting content to respective groups of network elements within an operating margin.

18. The method of claim 1, wherein generating a bitloading profile for each of the groups of network elements comprises:
adding a bitloading profile generated for another group of networks to a respective group of network elements.

19. A non-transitory computer-readable storage medium containing instructions, that when executed, control a computer system to be configured for:
receiving a plurality of RxMER vector error measurements from a plurality of network elements, wherein an error measurement measures an error in a modulation of a signal received by each respective network element;
generating a plurality of groups of network elements based on similarity of error measurements in the plurality of error measurements;
generating a bitloading profile for each of the plurality of groups of network elements based on the error measurements for each respective group of network elements, wherein each bitloading profile includes a modulation level determined to be sufficient for transporting content to respective groups of network elements;
assigning a set of bitloading profiles to each network element in the plurality of network elements based on the plurality of groups of network elements and the bitloading profile generated for each of the groups of network elements;

comparing the current set of bitloading profiles to a stored, past set of bitloading profiles used by the CMTS to modulate content sent to respective customer premise equipment associated with the set of bitloading profiles, and based on said comparison, selectively outputting the bitloading profile for each of the plurality of groups of network elements and the assigned set of bitloading profiles to a network device, wherein the network device uses the set of bitloading profiles to modulate content sent to respective customer premise equipment associated with the set of bitloading profiles.

20. An apparatus comprising:
one or more computer processors; and
a non-transitory computer-readable storage medium comprising instructions, that when executed, control the one or more computer processors to be configured for:
receiving a plurality of error measurements from a plurality of network elements, wherein an error measurement measures an error in a modulation of a signal received by each respective network element;
generating a plurality of groups of network elements based on similarity of error measurements in the plurality of error measurements;
generating a bitloading profile for each of the plurality of groups of network elements based on the error measurements for each respective group of network elements, wherein each bitloading profile includes a modulation level determined to be sufficient for transporting content to respective groups of network elements;
assigning a set of bitloading profiles to each network element in the plurality of network elements based on the plurality of groups of network elements and the bitloading profile generated for each of the groups of network elements;
comparing the current set of bitloading profiles to a stored, past set of bitloading profiles used by the CMTS to modulate content sent to respective customer premise equipment associated with the set of bitloading profiles, and
based on said comparison, selectively outputting the bitloading profile for each of the plurality of groups of network elements and the assigned set of bitloading profiles to a network device, wherein the network device uses the set of bitloading profiles to modulate content sent to respective customer premise equipment associated with the set of bitloading profiles.

* * * * *